(12) United States Patent
Kimura et al.

(10) Patent No.: US 6,400,571 B1
(45) Date of Patent: Jun. 4, 2002

(54) ELECTRONIC EQUIPMENT HOUSING

(75) Inventors: Naoki Kimura; Jun Niekawa, both of Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/422,245

(22) Filed: Oct. 21, 1999

(30) Foreign Application Priority Data

Oct. 21, 1998 (JP) ............................................ 10-298986

(51) Int. Cl.[7] .................................................. H05K 7/20
(52) U.S. Cl. ........................ 361/704; 361/753; 361/816; 165/185; 244/1 R
(58) Field of Search ................................ 361/702–712, 361/717, 719, 736, 752, 753, 759, 800, 814, 816, 818, 683, 684, 685; 174/35, 35 R, 16.3, 35 MS, 52.2, 252; 165/80.2, 80.3, 185; 257/706–727; 244/1 R, 129.1, 131; 428/33, 64.1, 64.3, 64.4, 65.2

(56) References Cited

U.S. PATENT DOCUMENTS

| | | | | |
|---|---|---|---|---|
| 4,053,943 A | * | 10/1977 | Galvin | 361/399 |
| 4,626,478 A | * | 12/1986 | Van Dyk Soerewyn | 428/596 |
| 4,788,627 A | * | 11/1988 | Ehlert et al. | 361/386 |
| 5,045,971 A | * | 9/1991 | Ono et al. | 361/385 |
| 5,190,241 A | * | 3/1993 | Pease | 244/1 R |
| 5,218,215 A | * | 6/1993 | Liang et al. | 257/712 |
| 5,298,791 A | * | 3/1994 | Liberty et al. | 257/707 |
| 5,305,186 A | * | 4/1994 | Appelt et al. | 361/704 |
| 5,487,926 A | * | 1/1996 | Kuribayashi et al. | 428/33 |
| 5,519,585 A | * | 5/1996 | Jones et al. | 361/818 |
| 5,835,350 A | * | 11/1998 | Stevens | 361/704 |
| 5,858,510 A | * | 1/1999 | Dressler | 428/167 |
| 6,183,570 B1 | * | 2/2001 | Kawaguchi et al. | 148/243 |

FOREIGN PATENT DOCUMENTS

| | | |
|---|---|---|
| JP | 59-24660 | 2/1984 |
| JP | 2-111524 | 4/1990 |
| JP | 3-244514 | 10/1991 |
| JP | 6-38251 | 5/1994 |
| JP | 10-41440 | 2/1998 |
| JP | 10-147857 | 6/1998 |
| JP | 10-151410 | 6/1998 |

OTHER PUBLICATIONS

Thermal Clad (Technical information, pp. 1–4), Aug. 2000.*

* cited by examiner

Primary Examiner—Gerald Tolin
Assistant Examiner—Michael Datskovsky
(74) Attorney, Agent, or Firm—Griffin & Szipl, P.C.

(57) ABSTRACT

The present invention relates to an electronic equipment housing usable for various types of electronic equipment such as note-type personal computers, portable information instruments, portable acoustic instruments, and on-vehicle electric materials.

The electronic equipment housing of the present invention is formed by bonding two or more plate-like members. These plate-like members are different in thickness from one another. These plate-like members are bonded together through an adhesive.

The electronic equipment housing of the present invention can efficiently radiate heat from heating parts, can prevent air bubbles from occurring in an adhesive between plate-like members, can reduce time required to produce the electronic equipment housing and can properly control the heat conduction.

5 Claims, 20 Drawing Sheets

| | |
|---|---|
| ▨ | 36 ℃ |
| ▩ | 35 ℃ |
| ▨ | 33 ℃ |
| ░ | 32 ℃ |
| ▨ | 30 ℃ |

ELECTRONIC EQUIPMENT HOUSING

FIELD OF THE INVENTION

The present invention relates to an electronic equipment housing usable for various types of electronic equipment such as notebook-type personal computers, portable information instruments, portable acoustic instruments, and on-vehicle electric materials.

BACKGROUND OF THE INVENTION

In general, the electronic equipment housings are used to protect electronic circuits and other parts and exposed to increased requirements with respect to precise parts mount, strength, heat radiation and others year-by-year. In addition, it is required to reduce the manufacturing and developing costs.

The electronic equipment housings according to the prior art had been mainly formed of plastics. However, the plastic electronic equipment housings tend to increase their wall-thickness for stiffness improvement, and provide degraded heat radiating properties and are also less effective for electromagnetic shield.

Recently, there have been used electronic equipment housings of magnesium or magnesium alloy. The magnesium is sufficiently stiff to form the housings into reduced wall-thickness, better in heat radiation and more effective in electromagnetic shielding. One of the electronic equipment housings formed of magnesium or magnesium alloy is disclosed in Japanese Patent Laid-Open Application No. Hei 10-151410, for example.

Another electronic equipment housing using panels of aluminum, which is higher in strength and lighter in weight, is disclosed in Japanese Patent Laid-Open Application No. Hei 10-147857, for example.

In a certain field of industrial application different from that of the present invention, there are known many anti-vibration steel plates of laminated structure in which a plastic or other is sandwiched between metal plates. Various types of laminated structures include a foamed material sandwiched between steel plates (Japanese Patent Laid-Open Application No. Hei 3-244514); a plastic layer sandwiched between aluminum palates (Japanese Patent Laid-Open Application No. Sho 59-24660); and a magnesium layer sandwiched between steel plates (Japanese Patent Laid-Open Application No. Hei 2-111524).

Since the electronic equipment housings of magnesium, magnesium alloy, aluminum or the like are superior in heat radiation, they can more effectively cause heating elements or others to radiate heat therefrom.

As shown in FIG. 20A, however, heat cannot effectively be radiated from a heating part 53 when two metal plates 50 and 51 are bonded to each other through an adhesive 52 and if one of the two metal plates contacting the heating part 53 is thinner, because said one metal plate provides a narrowed area to which the heat goes from the heating part 53.

As shown in FIG. 20B, furthermore, air bubbles 63 may occur in an adhesive 62 when two metal plates 60 and 61 are bonded to each other through the adhesive 62, because the adhesive 62 will not uniformly be applied to the bond area if the bonding area between the metal plates 60 and 61 is too large. If the air bubbles 63 occur in the adhesive 62, various problems may be raised in that the heat transfer from one metal plate 60 to the other metal plate 61 is degraded, that the adhesive strength in the adhesive 62 is reduced, that the metal plates 60 and 61 are forcedly separated from each other under the action of thermal expansion in the air bubbles 63, and so on.

If all the portions of the housing are to be produced by bonding plate-like members together, there is required much time to produce any housing portion that is required to have its larger thickness as in the peripheral frame.

Furthermore, since the heat conduction cannot properly be controlled in the laminated structure of the prior art anti-vibration steel plates, it could attain that heat is desirably transferred to a desired location, or, in other words heat is not desirably transferred to the desired location.

SUMMARY OF THE INVENTION

It is therefore an object of the present invention to provide an electronic equipment housing which can efficiently radiate heat from heating parts, which can prevent air bubbles from occurring in an adhesive between plate-like members, which can reduce time required to produce an electronic equipment housing and which can properly control the heat conduction.

In a first aspect of the present invention, an electronic equipment housing is characterized in that it is formed by bonding two or more plate-like members.

In a second aspect of the present invention, an electronic equipment housing is characterized in that it is formed by bonding two or more plate-like members, these plate-like members being different in thickness from one another.

In a third aspect of the present invention, an electronic equipment housing is characterized in that it is formed by bonding two or more plate-like members and that one plate-like member on a heating portion is formed to be larger in thickness than the other adjacent plate-like member.

In a fourth aspect of the present invention, an electronic equipment housing is characterized in that it is formed by bonding two or more plate-like members and that at least one groove or hole is formed in the bond area between the adjacent bonded plate-like members.

In a fifth aspect of the present invention, an electronic equipment housing is characterized in that it is formed by a plate-like member of metal having its thickness equal to or smaller than 1.2 mm and a frame member mounted on one surface of the plate-like member. The frame member may be made of metal, for example.

In a sixth aspect of the present invention, an electronic equipment housing is characterized in that it is formed by bonding two or more plate-like members and that the bond area between the adjacent boded plate-like members includes a heat-conduction regulating portion. The heat-conduction regulating portion may be at least one of various means such as a part of plastically deforming a portion of the plate-like member, spot-welding portion, heat conducting sheet, adhesive and heat insulator, which is disposed in any suitable place.

In a seventh aspect of the present invention, an electronic equipment housing is characterized in that it is formed by bonding two or more plate-like members, the plate-like members being formed with openings serving as means for reducing their weight.

In an eighth aspect of the present invention, an electronic equipment housing is characterized in that it is formed by bonding two or more plate-like members and that a heat pipe is mounted on said plate-like member. The heat pipe may be supported by outwardly turned cutouts in the plate-like member.

In a ninth aspect of the present invention, an electronic equipment housing is characterized in that it is formed by bonding two or more plate-like members and that an electronic part is mounted on said plate-like member. The electronic part may be mounted on outwardly turned cutouts in the plate-like member.

In a tenth aspect of the present invention, an electronic equipment housing is characterized in that it is formed by bonding two or more plate-like members and that a heat conducting member is provided between a plate-like member and a heating part mounted thereon.

In an eleventh aspect of the present invention, an electronic equipment housing is characterized in that it is formed by bonding two or more plate-like members, said plate-like members including openings formed therein for heat insulation.

In a twelfth aspect of the present invention, an electronic equipment housing is characterized in that it is formed by an integrally formed plate-like member, said plate-like member being formed with openings for heat insulation.

In a thirteenth aspect of the present invention, an electronic equipment housing is characterized in that the bond area between metallic plate-like members is subjected to any suitable chemical conversion such as phosphoric-acid chromating, chromic-acid chromating or the like.

The plate-like members may be bonded together through an adhesive.

The plate-like members may be partially formed of metal.

The plate-like members may be formed of any material selected from a group consisting of aluminum, aluminum alloys, copper, copper alloys, magnesium, magnesium alloys and MMC.

BRIEF DESCRIPTION OF THE DRAWINGS

FIG. 1A is a cross-sectional view of an electronic equipment housing constructed according to a first embodiment of the present invention while

FIG. 2 shows cross-sectional views illustrating experiments which have been carried out by the inventor.

DESCRIPTION OF THE PREFERRED EMBODIMENTS

Figure 1A:
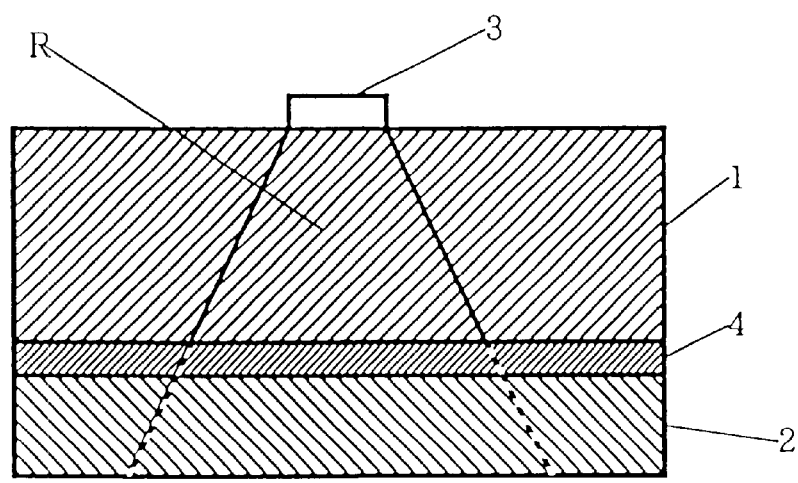
Figure 1B:
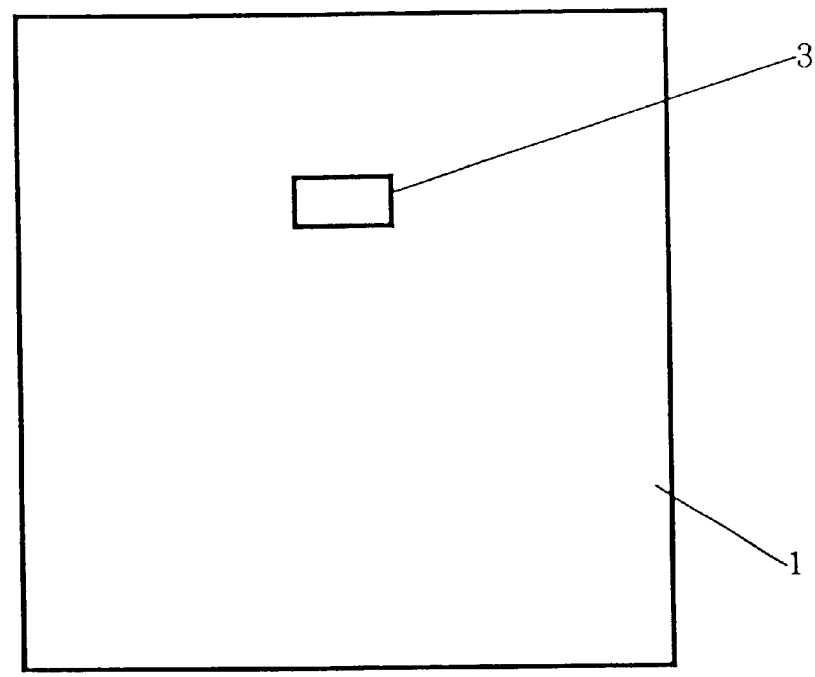
FIG. 1B is a plan view of the electronic equipment housing shown in FIG. 1A.

Some preferred embodiments of the present invention will now be described with reference to the drawings. FIG. 1A is a cross-sectional view of an electronic equipment housing constructed according to a first embodiment of the present invention while FIG. 1B is a plan view of the electronic equipment housing shown in FIG. 1A.

As shown in FIG. 1A, the electronic equipment housing according to the first embodiment of the present invention comprises two plate-like members 1 and 2 bonded to each other. One of the plate-like members 1 directly supporting a heating part 3 has its thickness larger than that of the other plate-like member 2. The thickness in the plate-like members 1 and 2 may suitably be selected depending on the situation in which the heating part 3 is used, such as temperature. The plate-like members 1 and 2 are formed of any suitable heat-radiative metal selected from a group consisting of aluminum, aluminum alloys, copper, copper alloys, magnesium, magnesium alloys, metal matrix composites (MMC) and others. MMC is a metal, for example, aluminum containing particles of carbon fiber or alumina. The plate-like members 1 and 2 are bonded to each other through an adhesive 4.

According to the first embodiment, an area R into which heat is dissipated from the heating part 3 can be increased to provide a more efficient heat radiation since the plate-like member 1 directly supporting the heating part 3 has its thickness larger than that of the other plate-like member 2.

According to the first embodiment, furthermore, a housing of complicated structure can be produced with reduced cost and with improved precision because a plurality of plate-like members can simultaneously be pressed by bonding them together. The electronic equipment housing may have a thicker plate-like member used to mount or reinforce the parts and a thinner plate-like member used to provide a decorative surface board.

Figure 2A:
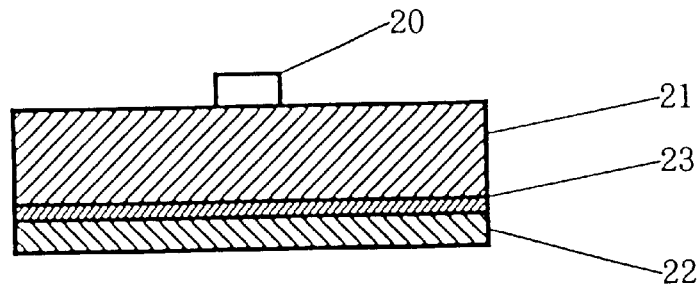
FIG. 2A shows an experiment in which a plate-like member supporting a heating part has its thickness larger than that of another plate-like member.
Figure 2B:
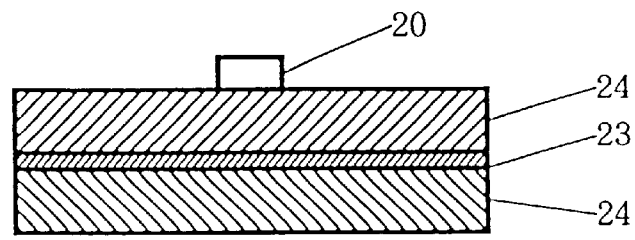
FIG. 2B shows another experiment in which two plate-like members bonded together have substantially the same thickness.
Figure 2C:
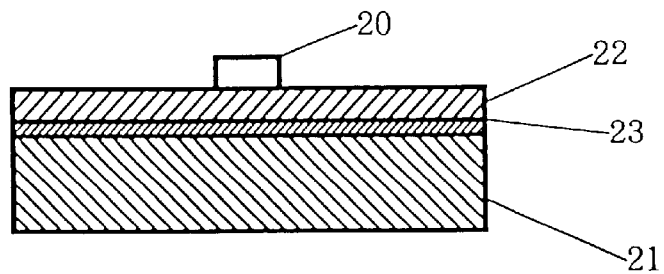
FIG. 2C shows still another experiment in which a plate-like member supporting a heating part has its thickness smaller than that of another plate-like member.

FIG. 2 is several cross-sectional views illustrating experiments which have been carried out by the inventor. In these experiments, temperature in the heating part was measured with respect to experimental pieces consisting of two bonded aluminum plates which are different in thickness from each other. FIG. 2A illustrates an experimental piece in which one aluminum plate 21 of 0.6 mm thick directly supporting a heating part 20 is bonded to another aluminum plate 22 of 0.1 mm thick through an adhesive layer 23 of 0.1 mm thick. FIG. 2B illustrates another experimental piece in which one aluminum plate 24 of 0.4 mm thick directly supporting a heating part 20 is bonded to another aluminum plate 24 of 0.4 mm thick through an adhesive layer 23 of 0.1 mm thick. FIG. 2C illustrates an experimental piece in which one aluminum plate 22 of 0.1 mm thick directly supporting a heating part 20 is bonded to another aluminum plate 21 of 0.6 mm thick through an adhesive layer 23 of 0.1 mm thick.

The heating part 20 was 10 mm square and each of the aluminum plates 22 and 24 was 230 mm long×300 mm wide. The heating part 20 had its heating value equal to 1 W and was naturally air-cooled at the underside thereof. The ambient temperature was 20° C. The thermal conductivity of the aluminum was 236 W/mK while the thermal conductivity of the adhesive was 0.2 W/mK.

In the experimental results, the temperature of the heating part 20 in the experimental piece of FIG. 2A was 25.42° C.; the temperature of the heating part 20 in the experimental piece of FIG. 2B was 25.80° C; and the temperature of the heating part 20 in the experimental piece of FIG. 2C was 26.63° C. It will be apparent from these experimental results that heat can most efficiently be dissipated from the heating part when the plate-like member directly supporting the heating part is thicker than the other plate-like member.

Figure 3A:
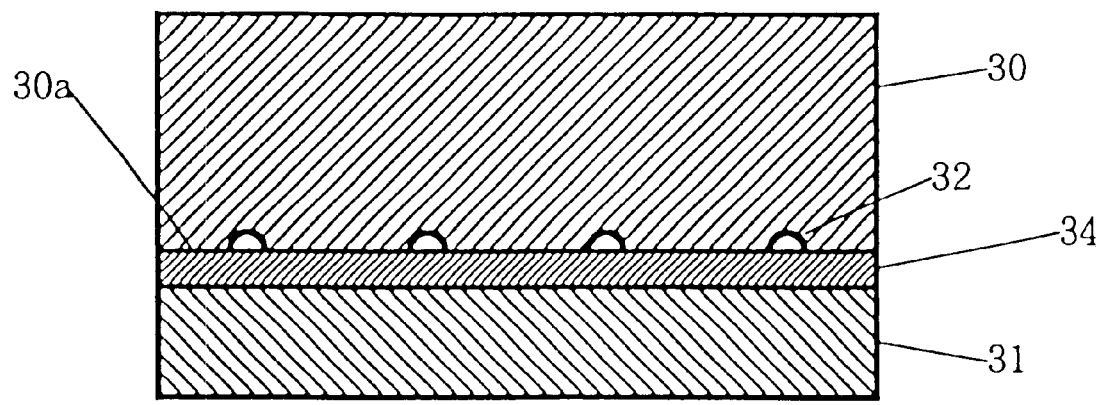
FIG. 3A is a cross-sectional view of an electronic equipment housing constructed according to a second embodiment of the present invention.
Figure 3B:
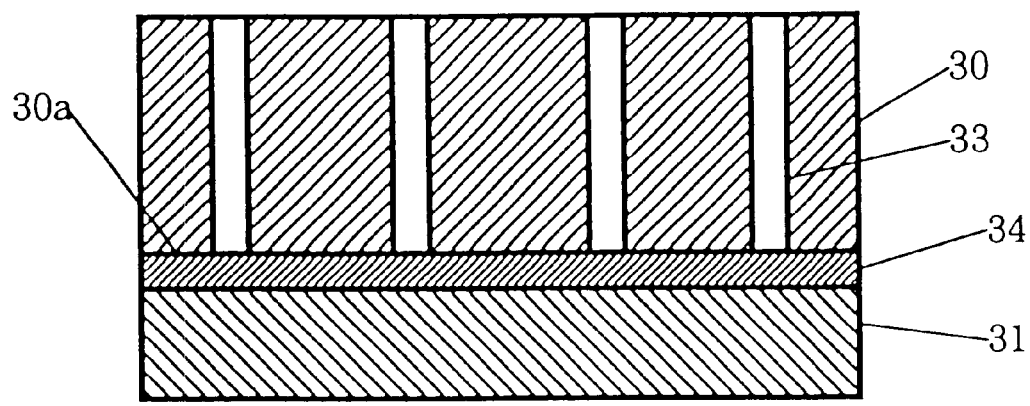
FIG. 3B is a cross-sectional view of the other electronic equipment housing.

FIG. 3 shows cross-sectional views of electronic equipment housings constructed according to the second embodiment of the present invention. As shown in FIG. 3A, the electronic equipment housing includes a plate-like member 30 having its bond area 30a in which a plurality of grooves 32 are formed for air vent or for adhesive bleeding. Alternatively, as shown in FIG. 3B, the bond area 30a of the plate-like member 30 may include a plurality of vertical holes 33 formed therethrough for air vent or for adhesive bleeding.

According to the second embodiment, any air bubble do not occur within adhesive layer 34 since the air-vent or adhesive-bleeding grooves or holes (32 or 33) are formed in the bond area 30a. Although the holes 33 are formed parallel to one another in the illustrated form, the holes 33 may extend through the plate-like member 30 with any suitable angle such as 45, 60 or 90 degrees. As a result, the heat conduction between the plate-like members 30 and 31 as well as the adhesive power in the adhesive 34 can better be maintained. Even if the temperature in the housing rapidly increases, the plate-like members 30 and 31 can be prevented from being separated from each other. If the grooves 32 are formed together with the holes 33, the aforementioned effect can further be improved.

Figure 4:
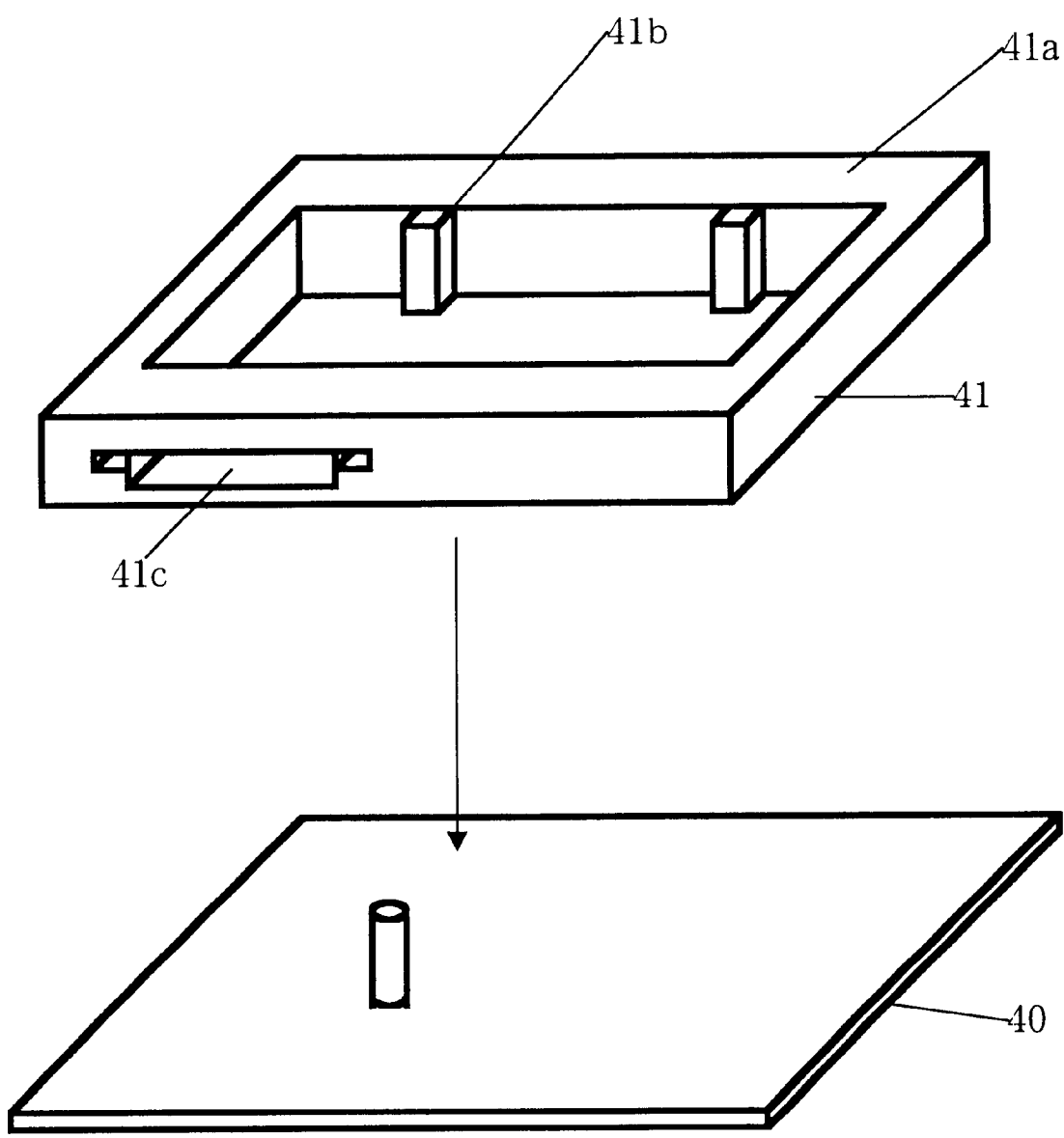
FIG. 4 is a perspective view of an electronic equipment housing constructed according to a third embodiment of the present invention.

FIG. 4 is a perspective view of an electronic equipment housing constructed according to the third embodiment of the present invention. The electronic equipment housing has a plate-like member 40 of 1.2 mm or less thick and an integrally molded frame member 41 mounted on the surface of the plate-like member 40. The thickness of the frame member 41 is larger than that of the plate-like member 40. These members 40 and 41 are formed of metal such as aluminum or the like. The plate-like member 40 is of laminated structure consisting of rolled sheets bonded together while the frame member 41 is integrally molded through die-casting with the peripheral edges 41a, hinge bosses 41b, complicated opening 41c and the like.

According to the third embodiment, therefore, time required to produce the electronic equipment housing can greatly be reduced in comparison with a housing wholly formed by bonded plate-like members, since the frame member 41 forming the outer periphery of the housing and having its increased thickness is integrally molded through one pass. Depending on the shape of the housing, however, the frame member may be formed by two or more members.

Figure 5:
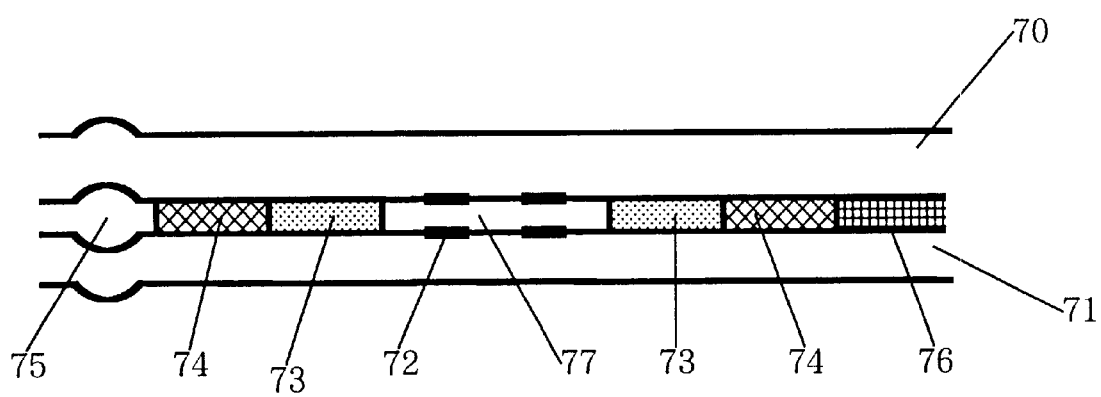
FIG. 5 illustrates an electronic equipment housing constructed according to a fourth embodiment of the present invention.

FIG. 5 shows the structure of an electronic equipment housing constructed according to the fourth embodiment of the present invention. In this the electronic equipment housing, as shown in FIG. 5, plate-like members 70 and 71 formed of metal such as aluminum are bonded to each other. The bond area between the adjacent boded plate-like members includes a heat-conduction regulating portion (a portion that regulates heat conduction). The heat-conduction regulating portion may be at least one of various means such as spot-welding portions 72, heat conducting sheets 73, adhesive layers 74, plastically deformed and outwardly convex parts 75 of the plate-like members 70 and 71 and a heat insulating portion such as a heat insulating sheet 76, all of which may properly be disposed depending on the purposes.

The spot welding portions 72 join the mutually superimposed plate-like members 70 and 72 to each other with an aluminum plate 77 disposed therebetween. However, the plate-like members 70 and 71 may be spot-welded directly to each other without the aluminum plate 77 after the plate-like members have been deformed into inwardly concave configuration.

Easy transfer of heat is normally superior in the order of the spot-welding portions 72, heat conducting sheets 73, adhesive layers 74, heat insulating portion 76 and plastically deformed and outwardly convex parts of the plate-like members 70, 71 as described. Thus, the heat conduction can be regulated together with the desired direction of heat flow by properly arranging these heat-conduction regulating portions depending on the purpose.

Figure 6:
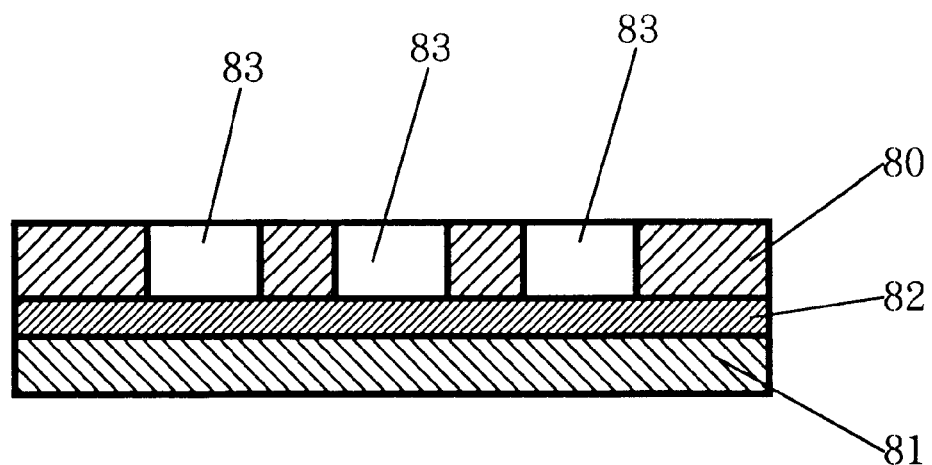
FIG. 6 illustrates an electronic equipment housing constructed according to a fifth embodiment of the present invention.
Figure 7A:
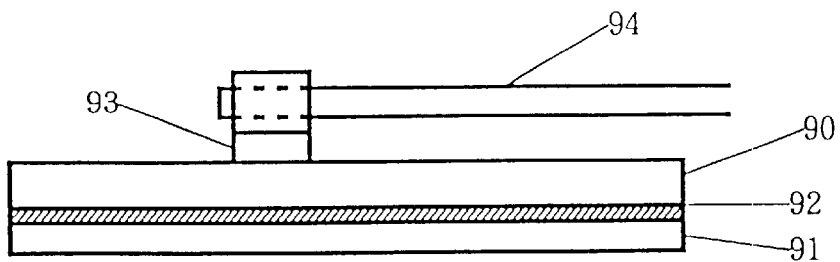
FIGS. 7A–D illustrate an electronic equipment housing constructed according to a sixth embodiment of the present invention.
Figure 7B:
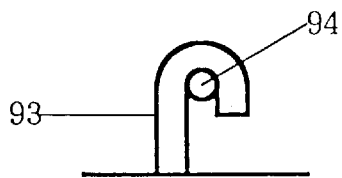
Figure 7C:
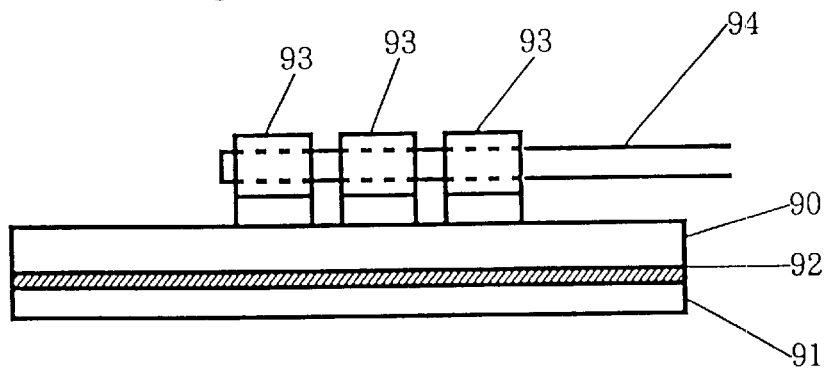
Figure 7D:
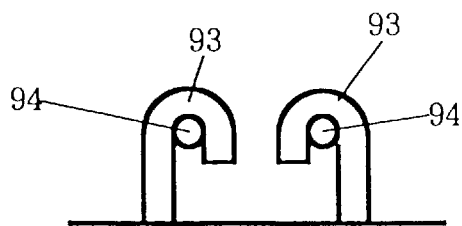

FIG. 6 illustrates an electronic equipment housing constructed according to the fifth embodiment of the present invention. As shown in FIG. 6, the electronic equipment housing comprises plate-like members 80 and 81 formed of metal such as aluminum and bonded to each other through an adhesive layer 82. One of the plate-like members 80 is formed with openings 83 for purpose of reducing the weight of the housing. The shape of the openings 83 may be any one of various configurations such as circle, square and others while the size thereof may suitably be selected depending on the necessity. From the viewpoint of design, the openings 83 are preferably formed in the inner plate-like member 80. However, the openings 83 may be formed in the outer plate-like member 81. Alternatively, the openings 83 may be formed in both the plate-like members 80 and 81.

FIG. 7 illustrates various modified forms of an electronic equipment housing constructed according to the sixth embodiment of the present invention. As shown in FIGS. 7A and B, the electronic equipment housing comprises plate-like members 90 and 91 formed of metal such as aluminum and bonded to each other through an adhesive layer 92. The inner plate-like member 90 includes an outwardly turned cutout 93 having a downwardly turned top end which firmly supports a heat pipe 94. In this electronic equipment housing, heat from the plate-like member 90 will be radiated by the heat pipe 94 through the outwardly turned cutout 93. As shown in FIG. 7C, the heat pipe 94 may firmly be supported by a plurality of similar cutouts 93 (three being shown in FIG. 7C). Thus, the heat pipe 94 can more stably be supported and disposed with respect to the plate-like member. Alternatively, a plurality of outwardly turned cutouts 93 (two being shown in this figure) may firmly and stably support a plurality of heat pipes 94 (two being shown in this figure), respectively.

Figure 8A:
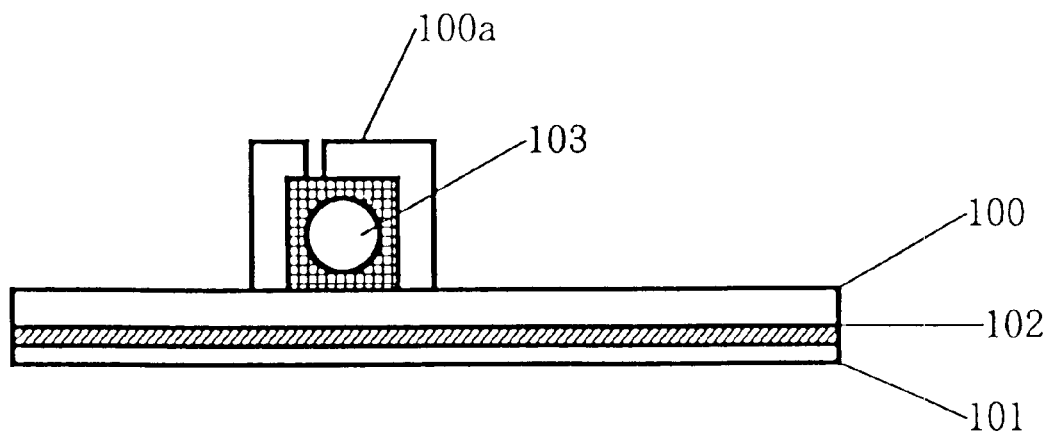
FIGS. 8A and B illustrate an electronic equipment housing constructed according to a seventh embodiment of the present invention.

FIG. 8 illustrates two modified forms of an electronic equipment housing constructed according to the seventh embodiment of the present invention. As shown in FIG. 8A, the electronic equipment housing may comprise plate-like members 100 and 101 formed of metal such as aluminum and bonded to each other through an adhesive layer 102. A cooling fan 103 is mounted on the inner plate-like member 100. The cooling fan 103 serves to cool the plate-like member 100.

Figure 8B:
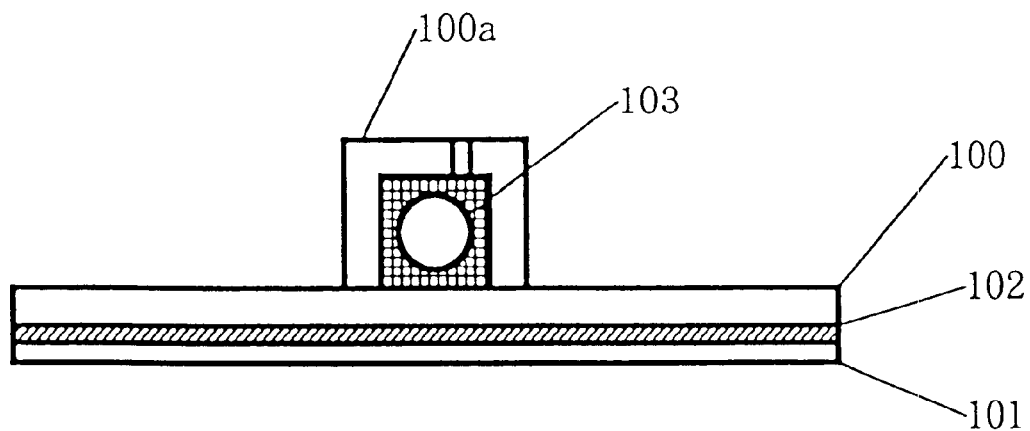

The cooling fan 103 may be mounted on the inner plate-like member 100 through outwardly turned cutouts 100a. As shown in FIG. 8B, therefore, the position of the cooling fan 103 mounted on the inner plate-like member 100 may freely be selected depending on the necessity even though a number of inner plate-like members 100 have been molded by the same mold.

The cooling fan may be replaced by any one of various electronic parts such as hard disks, batteries, basic boards, connectors and so on.

FIG. 9 illustrates various modified forms of an electronic equipment housing constructed according to the eighth embodiment of the present invention. As shown in FIG. 9A, the electronic equipment housing may comprise plate-like members 110 and 111 formed of metal such as aluminum and bonded to each other through an adhesive layer 112. A sheet-like heat conducting member 114 is located between the inner plate-like member 110 and a heating part 113 mounted on the inner plate-like member 110. According to such an arrangement, heat from the heating part 113 may more efficiently be conducted to and radiated from the plate-like member 110 through the heat conducting member 114.

Figure 9A:
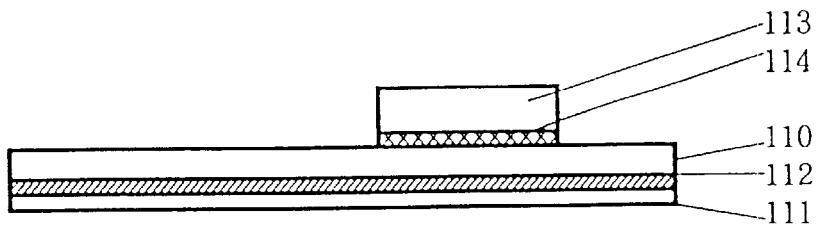
FIGS. 9A–D illustrate an electronic equipment housing constructed according to an eighth embodiment of the present invention.
Figure 9B:
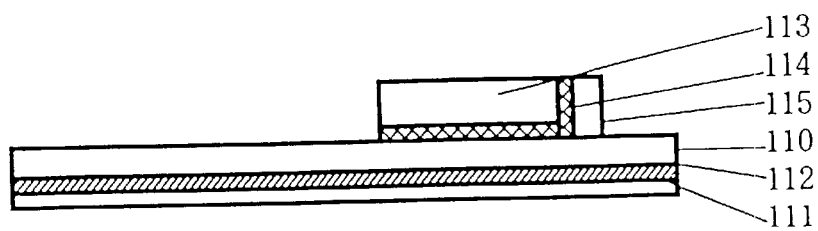
Figure 9C:
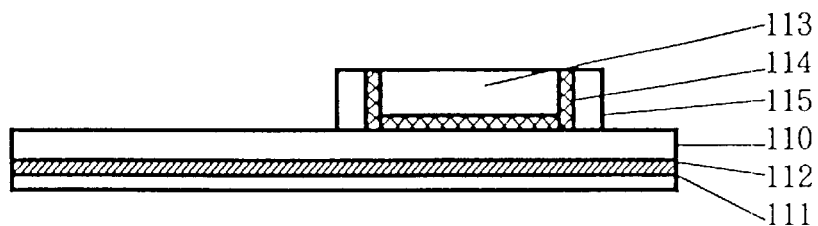
Figure 9D:
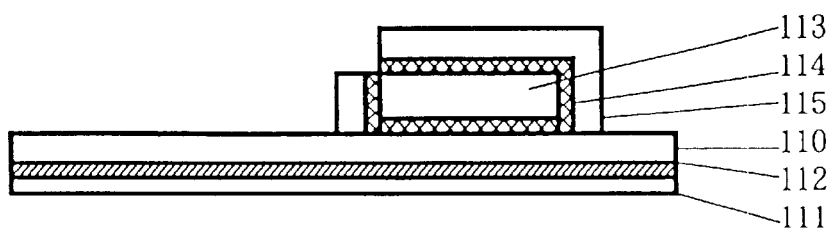

As shown in FIGS. 9B–D, the sheet-like heat conducting member 114 may extend into between the heating part 113 and any outwardly turned cutout 115 used to mount the heating part 113 on the plate-like member 110.

FIG. 10 illustrates various modified forms of an electronic equipment housing constructed according to the ninth embodiment of the present invention. As shown in FIG. 10A, this electronic equipment housing may comprise plate-like members 120 and 121 formed of metal such as aluminum and bonded to each other through an adhesive layer 122. At least one heat insulation opening 125 is formed through the inner plate-like member 120 between a heating part 123 mounted on the inner plate-like member 120 and another electronic part 124 mounted on the same plate-like member. In such an arrangement, heat generated by the heating part 123 can be prevented from conducting to the other electronic part 124 through heat insulation due to the opening or openings 125 and adhesive layer 122. Therefore, the operational efficiency of the electronic part 124 adjacent to the heating part 123 can be prevented from being degraded under influence of heat. In addition, the service life in the electronic equipment housing can be prolonged.

Figure 10A:
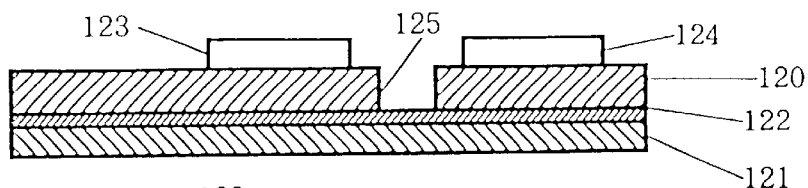
FIGS. 10A–E illustrate an electronic equipment housing constructed according to a ninth embodiment of the present invention.
Figure 10B:
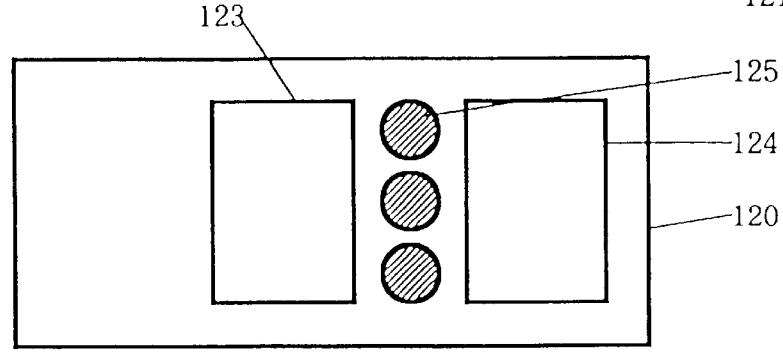
Figure 10C:
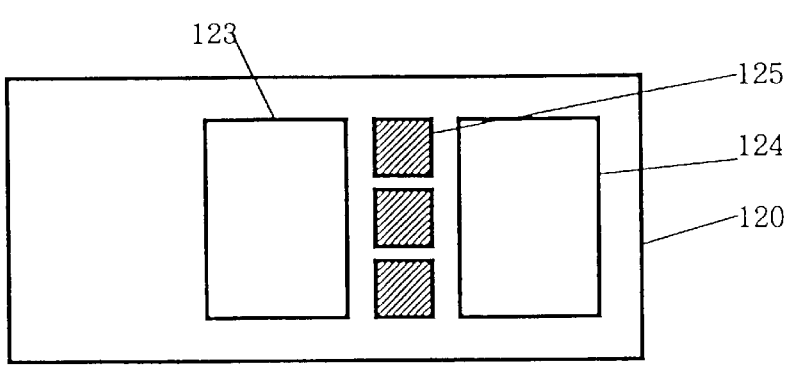
Figure 10D:
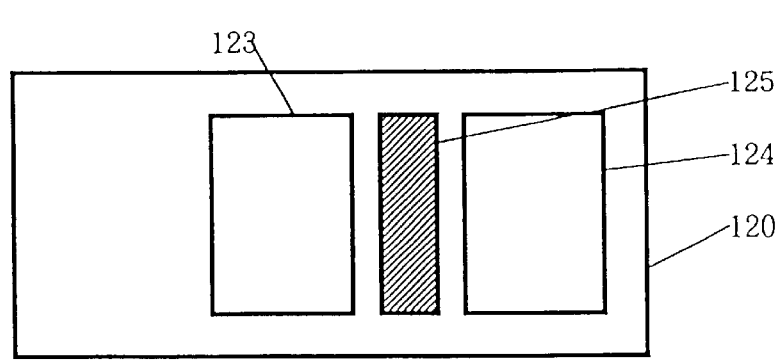
Figure 10E:
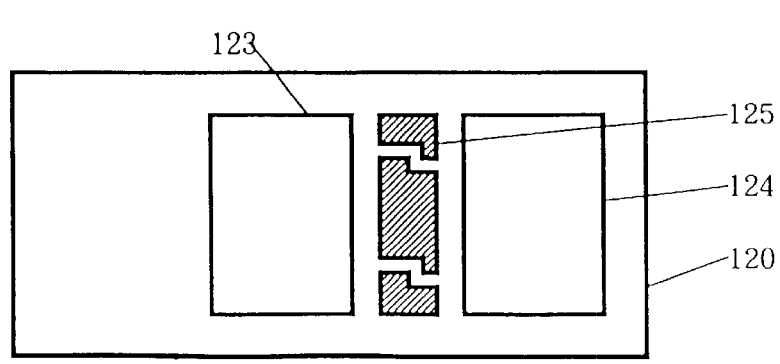

The at least one opening 125 may be configured in any suitable form such as a plurality of circular openings 125 (FIG. 10B), a plurality of square openings 125 (FIG. 10C) or a single rectangular opening 125 (FIG. 10D), for example. Alternatively, the openings 125 may be formed leaving part of the plate-like member 120 therebetween, as shown in FIG. 10E.

Figure 11A:
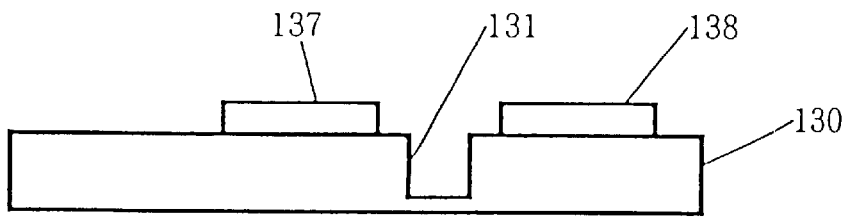
FIGS. 11A–C illustrate an electronic equipment housing constructed according to a tenth embodiment of the present invention.
Figure 11B:
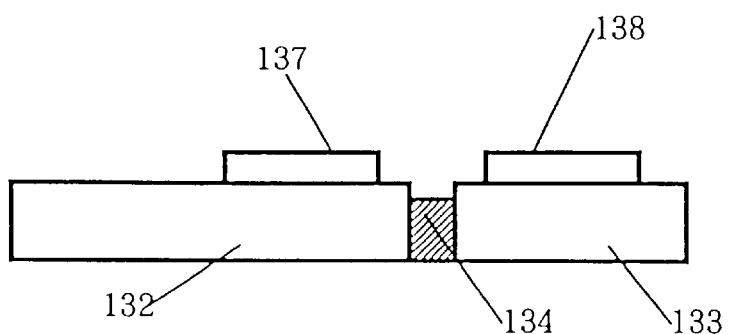
Figure 11C:
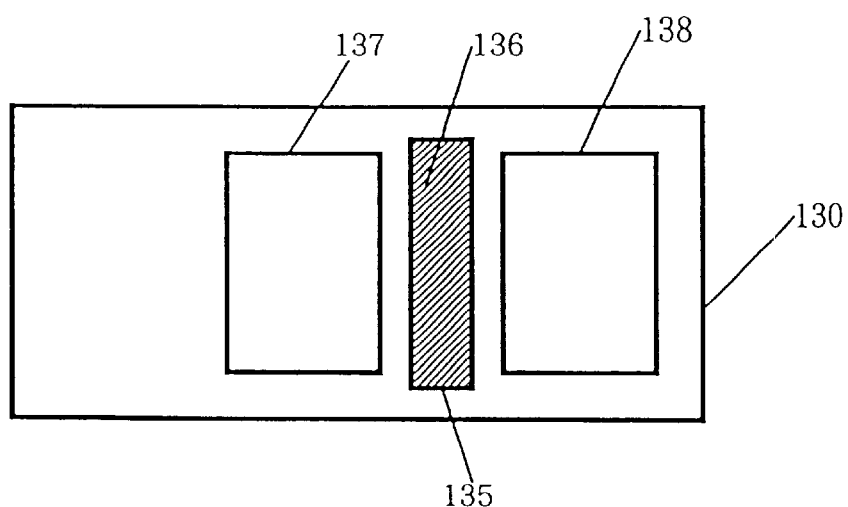

FIG. 11 illustrates various modified forms of an electronic equipment housing constructed according to the tenth embodiment of the present invention. As shown in FIG. 11A, the electronic equipment housing may comprise a single plate-like member 130 integrally formed of metal such as aluminum. The plate-like member 130 includes a heat insulation opening 131 formed therein. As shown in FIG. 11B, the electronic equipment housing may comprise two plate-like members 132 and 134, the opposite sides of which are bonded to each other by a resin 134. As shown in FIG. 11C, further, the electronic equipment housing may comprise a single plate-like member 130 formed with a recess 135 which is filled with a resin 136.

In such an arrangement, heat from a heating part 137 may be prevented from conducting to an adjacent electronic part 138 by the existence of the opening 131 or resin 134 or 136. Therefore, the operational efficiency of the electronic part 138 adjacent to the heating part 137 can be prevented from being degraded under influence of heat. In addition, the service life in the electronic equipment housing can be prolonged. In this connection, Japanese Patent Laid-Open Application No. Hei 10-41440 discloses a module part including heat insulation grooves formed therein; and Japanese Utility Model Laid-Open Application No. Hei 6-38251 discloses a heat radiating device including a heat sink through which heat insulation apertures are formed. However, these parts or devices are not intended to be used for such a housing as in the present invention.

Figure 12A:
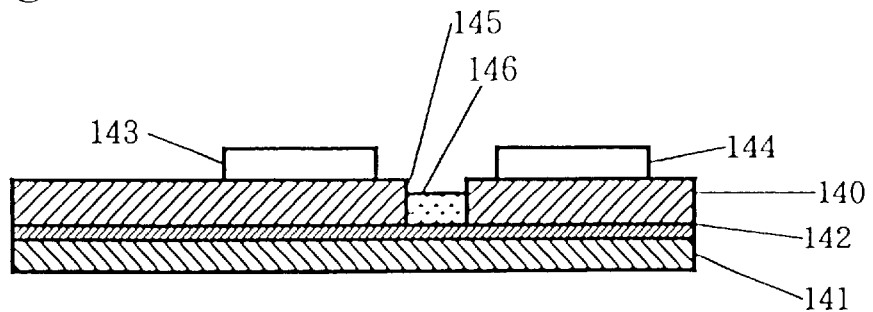
FIGS. 12A–C illustrate an electronic equipment housing constructed according to an eleventh embodiment of the present invention.

FIG. 12 illustrates an electronic equipment housing constructed according to the eleventh embodiment of the present invention. As shown in FIG. 12A, the electronic equipment housing may comprise two plate-like members 140 and 141 formed of metal such as aluminum and bonded to each other through an adhesive layer 142. The electronic equipment housing includes an opening 145 formed therein between a heating part 143 mounted on the inner plate-like member 140 and the other electronic part 144 mounted on the same member. A curved and thermally deformable member 146 is mounted in the opening 145 to extend along one inner side. The thermally deformable member 146 may be formed of any suitable shape memory alloy such as bimetal, Ti-Ni alloy or the like.

Figure 12B:
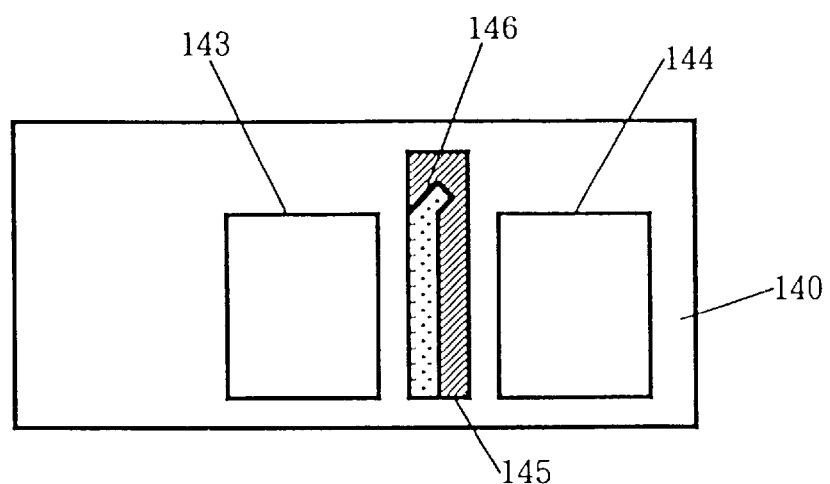
Figure 12C:
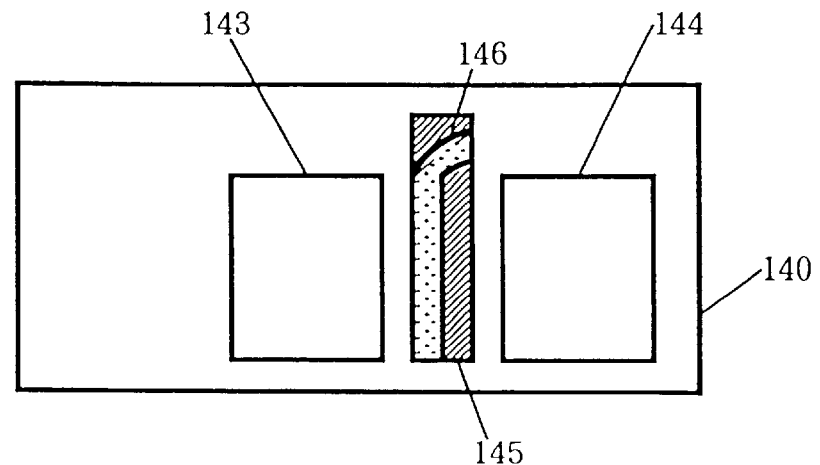

If no heat is generate by the heating part 143, the forward tip of the thermally deformable member 146 does not contact the other inner side of the opening 145, as shown in FIG. 12B. As heat is generated from the heating part 143, the thermally deformable member 146 deformably elongates to bring its forward end into contact with the other inner side of the opening 145, as shown in FIG. 12C. Thus, the heat generated by the heating part 143 will be conducted to bypass the other electronic part 144 through the thermally deformable member 146. From the viewpoint of thermal conductivity, the thermally deformable member 146 may be replaced by a heat pipe.

Figure 13:
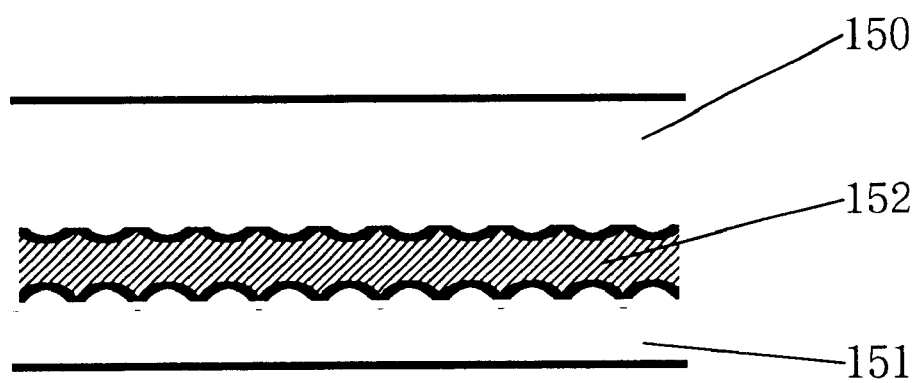
FIG. 13 illustrates an electronic equipment housing constructed according to a twelfth embodiment of the present invention.

FIG. 13 illustrates an electronic equipment housing constructed according to the twelfth embodiment of the present invention. This electronic equipment housing may comprise two plate-like members 150 and 151 formed of metal such as aluminum and bonded to each other through an adhesive layer 152. The bond area of each of the plate-like members 150 or 151 is wholly or partially roughened to have small dimples of size larger than one microns. In such an arrangement, the roughened bond surfaces of the plate-like members 150 and 151 improve the adhesive strength and increase the reliability in the final product. Experiments carried out by the inventor showed that when the plate-like members had their surface roughness equal to 1 $\mu$m, 3 $\mu$m and 5 $\mu$m, the adhesive strength was 2.4 Kg/mm$^2$, 2.8 Kg/mm$^2$ and 3.0 Kg/mm$^2$, respectively. It can be found that as the plate-like members are more roughened, the adhesive strength can be increased.

Figure 14A:
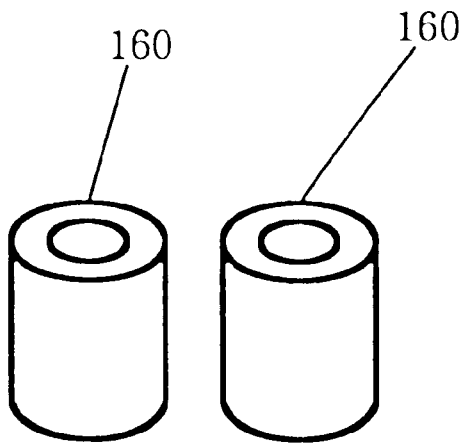
FIGS. 14A and B are perspective views illustrating raised parts to be mounted in the electronic equipment housing according to the present invention.
Figure 14B:
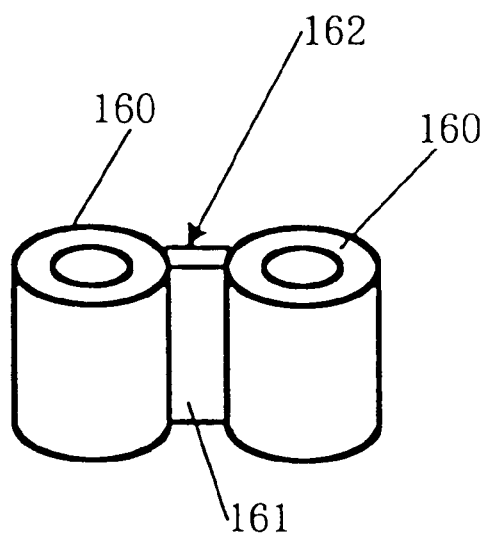

FIG. 14 is a perspective view illustrating several modified forms of parts to be mounted on an electronic equipment housing of the present invention. As shown in FIG. 14A, if parts 160 such as bosses are separately mounted on a plate-like member, it is difficult to secure the dimensional precision between the parts 160. As shown in FIG. 14B, thus, two parts 160 may integrally be connected to each other by an intermediate part 161 to form a composite part 162 which is in turn mounted on a plate-like member. Therefore, the dimensional precision between the parts 160 can be improved with improved strength. This can also improve the reliability in the final product. The number of parts to be mounted in the electronic equipment housing as a composite part may be equal to or larger than three.

FIG. 15 illustrates various modified forms of raised portions which are mounted on an electronic equipment housing according to the present invention. For example, a cantilever type raised portion may be formed by pressing a flat sheet and turning the pressed sheet into substantially L-shaped cross-section (see FIG. 15A). In this case, the turned leg portion may be formed with a part mounting hole 171. Furthermore, a flat sheet may be pressed and turned into substantially inverted C-shaped cross-section to form a center raised portion 172 (see FIG. 15B). In such a case, the top of the center raised portion 172 may include a part mounting hole 173 formed therethrough.

Figure 15A:
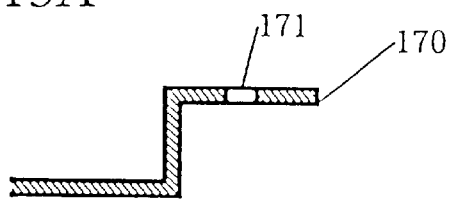
FIGS. 15A–E are cross-sectional side views illustrating various structures of raised part to be mounted in the electronic equipment housing of the present invention.
Figure 15B:
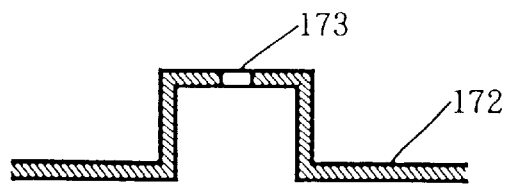
Figure 15C:
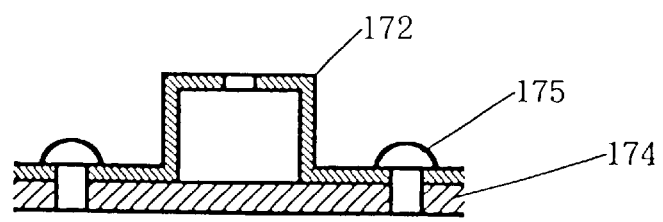
Figure 15D:
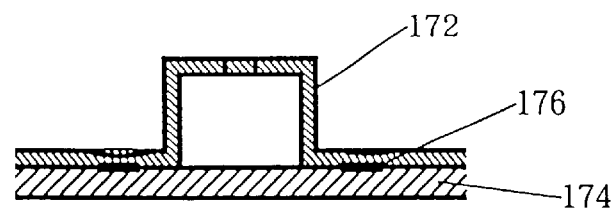
Figure 15E:
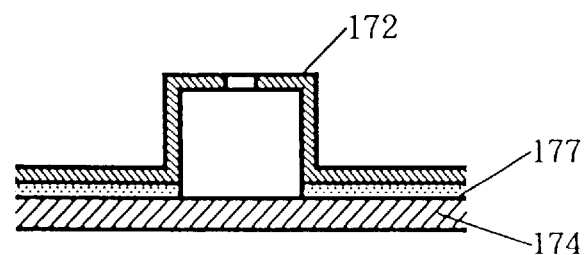

The raised portion 172 may be mounted on a plate-like member 174 in the electronic equipment housing of the present invention by any suitable one of various methods such as spot-welding 176 (see FIG. 15D) or adhesive 177 (see FIG. 15E).

Figure 16A:
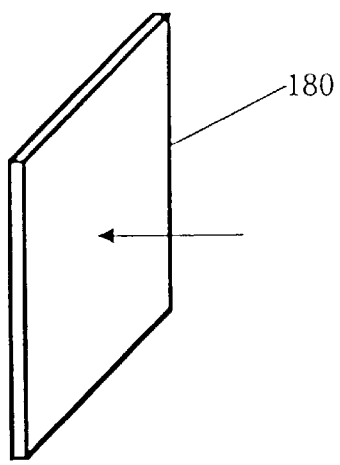
FIGS. 16A–C illustrate the other structures of raised part to be mounted in the electronic equipment housing of the present invention.
Figure 16B:
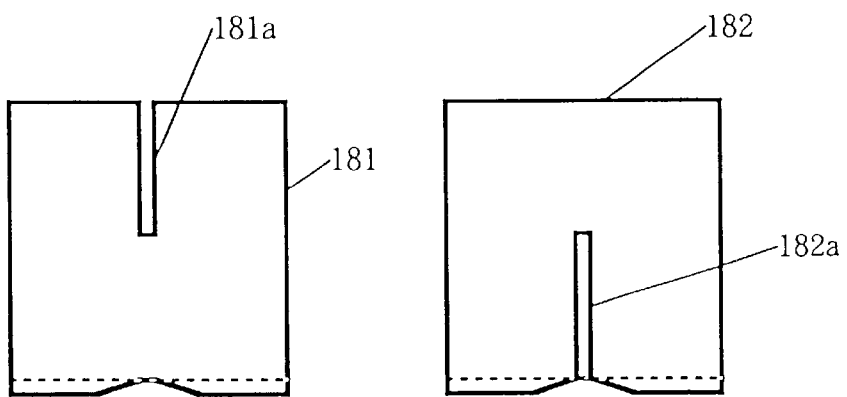
Figure 16C:
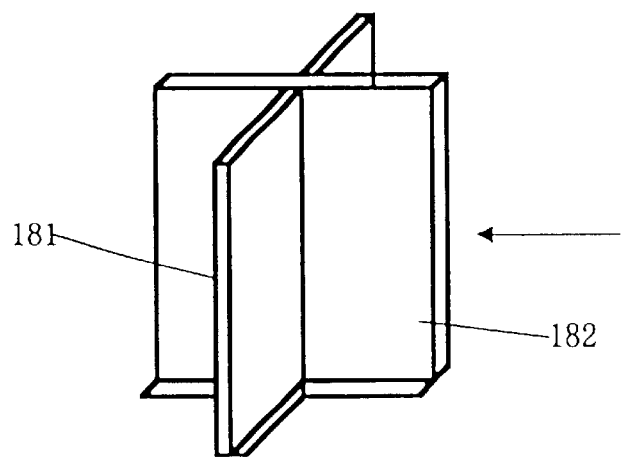

FIG. 16 illustrates another raise portion to be mounted on an electronic equipment housing according to the present invention. If a flat plate 180 is mounted on a plate-like member in such a manner as shown in FIG. 16A, the plate 180 tends to fall down when it receives a force as shown by arrow in FIG. 16A. As shown in FIG. 16B, thus, a first flat plate 181 is provided to include an elongated and top-opened notch 181a formed therein at the top while a second flat plate 182 is provide to include an elongated and bottom-opened notch 182a formed therein at the bottom. As shown in FIG. 16C, the first and second flat plates 181 and 182 are then assembled to form a cross-shaped unit by engaging the notch 182a of the second flat plate 182 into the notch 181a of the first flat plate 181. The bottoms of the first and second flat plates 181 and 182 are then outwardly turned. The outwardly turned plate portions are finally fixedly mounted on the electronic equipment housing through any suitable means such as riveting or spot-welding. Thus, the raised portion will sufficiently oppose such a force as shown by arrow in FIG. 16A.

Figure 17A:
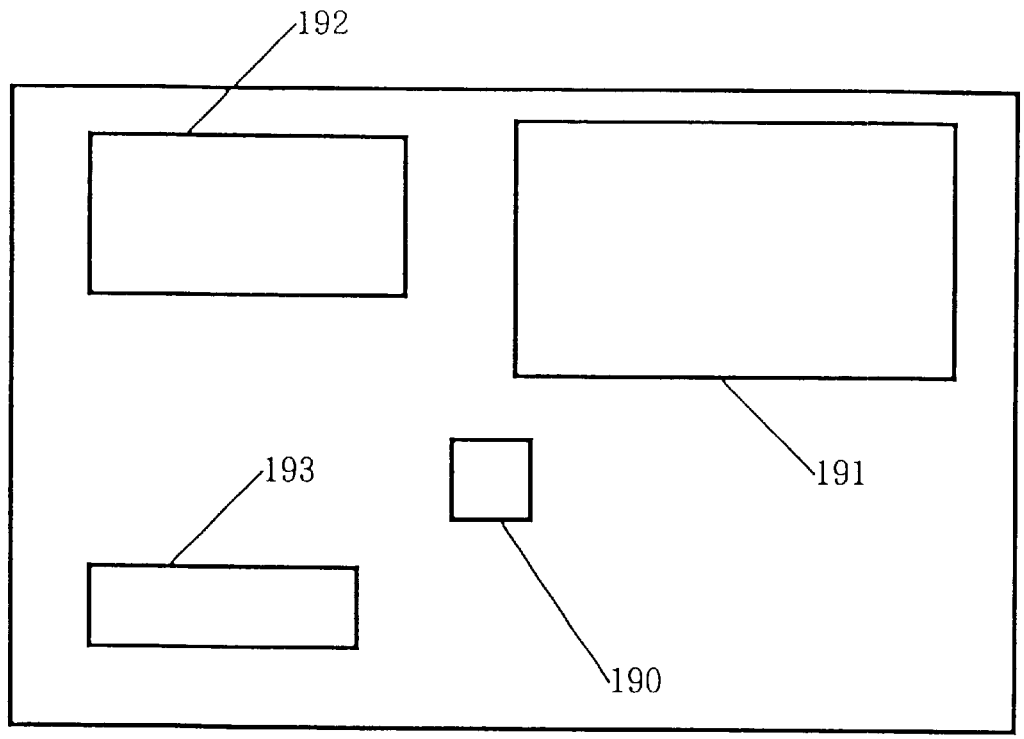
FIGS. 17A and B are schematic plan views illustrating the interior of an electronic equipment housing, that is, a personal computer used in an experiment by the inventor.

FIGS. 17A and B are plan views schematically illustrating the interiors of electronic equipment housings for personal computers or the like which have been used in experiments carried out by the inventor.

The interior of the electronic equipment housing shown in FIG. 17A includes a CPU 190, a battery 191, a hard disk 192 and a converter 193, all of which are suitably disposed therein. On the other hand, the electronic equipment housing shown in FIG. 17B further comprises heat pipes 194 mounted on the CPU 190 and battery 191 for heat radiation. The heat pipers 194 may be supported by outwardly turned cutouts 195 in the inner plate-like member, for example, as shown in FIG. 7. A heat insulation opening 196 is formed to partially surround the hard disk 192.The converter 193 is supported on the inner plate-like member 197 by an outwardly turned cutout 197.

Experiments carried out by the inventor showed that when the electronic equipment housing of FIG. 17A is formed of magnesium plate, the temperatures in the CPU and hard disk (190, 192) increased up to 78° C. and 62° C., respectively. The battery 191 required three hours to charge it while maintaining at a temperature equal to or lower than 45° C. The temperature in the outer heat spot was equal to 44.2° C.

When the electronic equipment housing of FIG. 17A is formed of laminated aluminum plate, the temperatures in the CPU and hard disk (190, 192) could be suppressed up to 65° C. and 55° C., respectively. The battery 191 required two hours to charge it while maintaining at a temperature equal to or lower than 45° C. It is apparent that the charging time is reduced. The temperature of the outer heat spot was reduced to 38.0° C.

When the electronic equipment housing of FIG. 17A is formed of laminated aluminum plate, the temperatures in the CPU and hard disk (190, 192) could further be suppressed up to 60° C. and 51° C., respectively. The battery 191 required 1.5 hours to charge it while maintaining at a temperature equal to or lower than 45° C. It is apparent that the charging time is further reduced. The temperature of the outer heat spot was further reduced to 37.1° C.

Figure 17B:
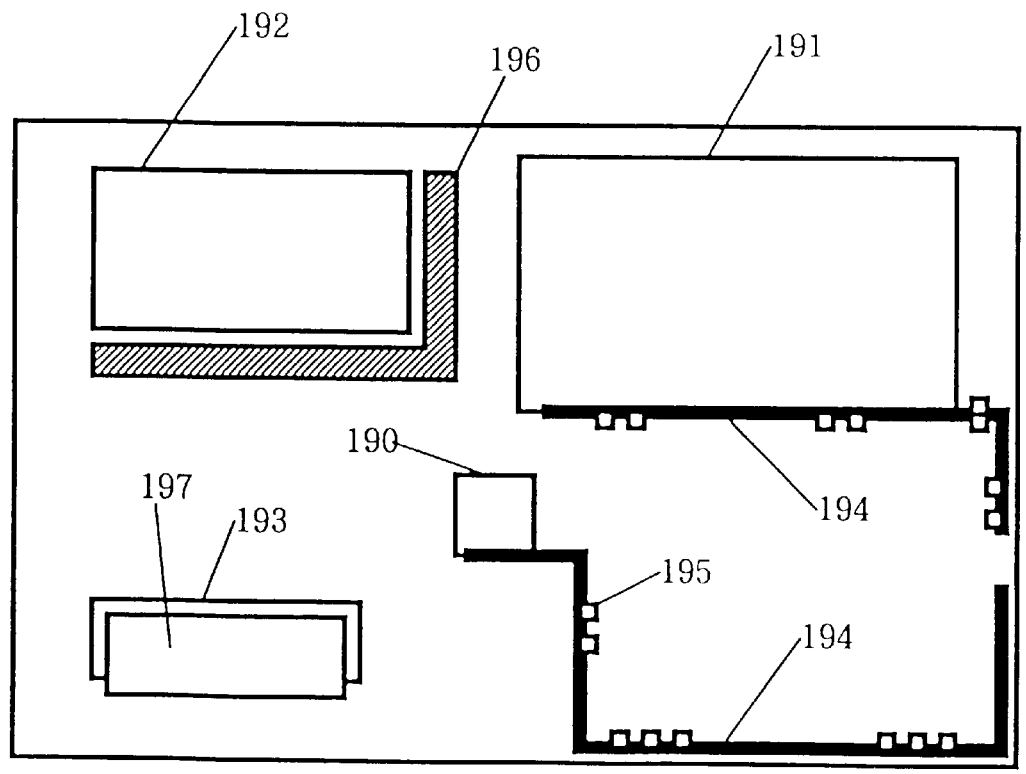

It will therefore be apparent that when the electronic equipment housing of FIG. 17B is formed of laminated aluminum plate, the heat conduction is best controlled with superior heat radiation and cooling properties. With the housing of aluminum, it has been found that the vibration is reduced by about 6 dB as measured by an accelerometer, in comparison with the housing of magnesium.

With the housings shown in FIGS. 17A and B, it is general that paint is applied to the outer walls thereof for purpose of improvement in design. Either of pre- or post-coating may be used, but it is preferable that the housing of aluminum is pre-coated.

Figure 18:
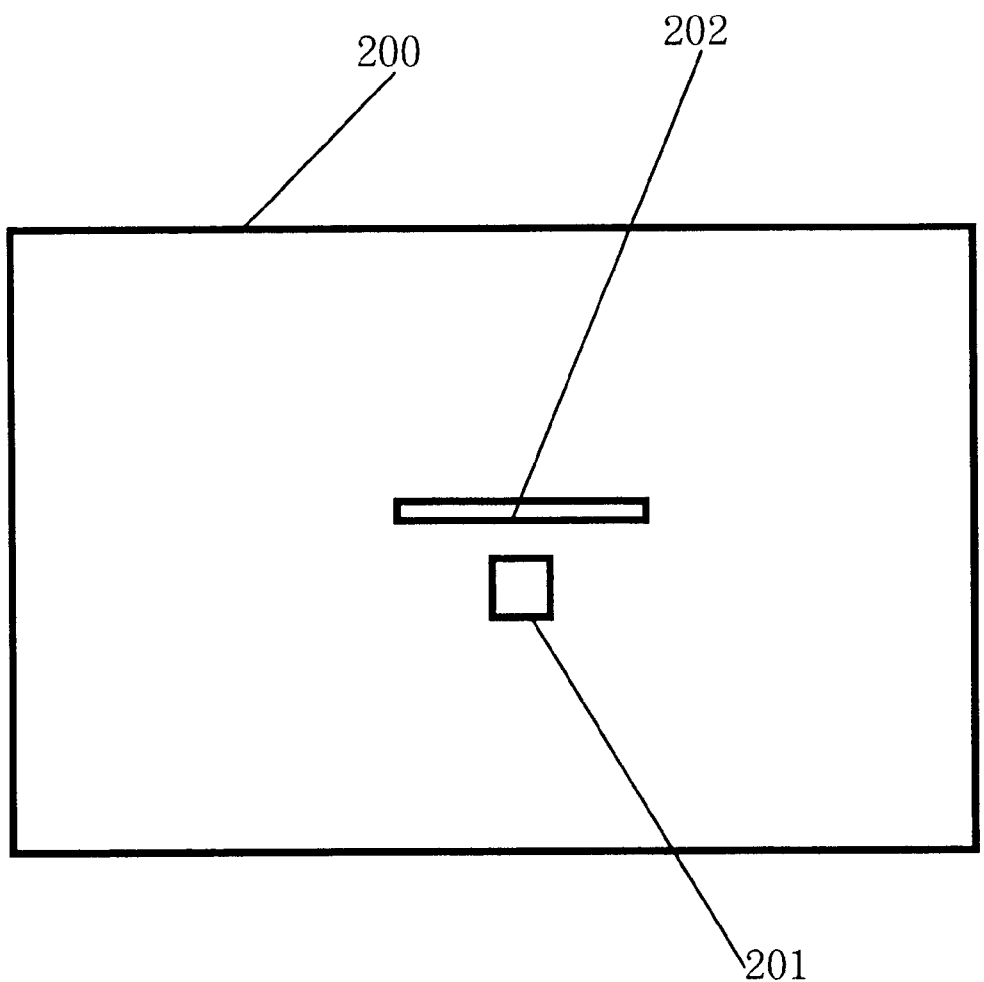
FIG. 18 illustrates an experiment carried out by the inventor.

FIG. 18 illustrates an experiment carried out by the inventor. In this experiment, a CPU 201 being a heating part was mounted on a plate of aluminum 200. The plate 200 included a heat insulation opening 202 formed therein adjacent to the CPU 201. The distribution of temperature was then measured. In this connection, the aluminum plate had its dimension of 230 mm long×300 mm width. The heating value in the heating part 201 was equal to 13 W. The ambient temperature was 25° C. The heating part 201 was naturally air-cooled.

Figure 19:
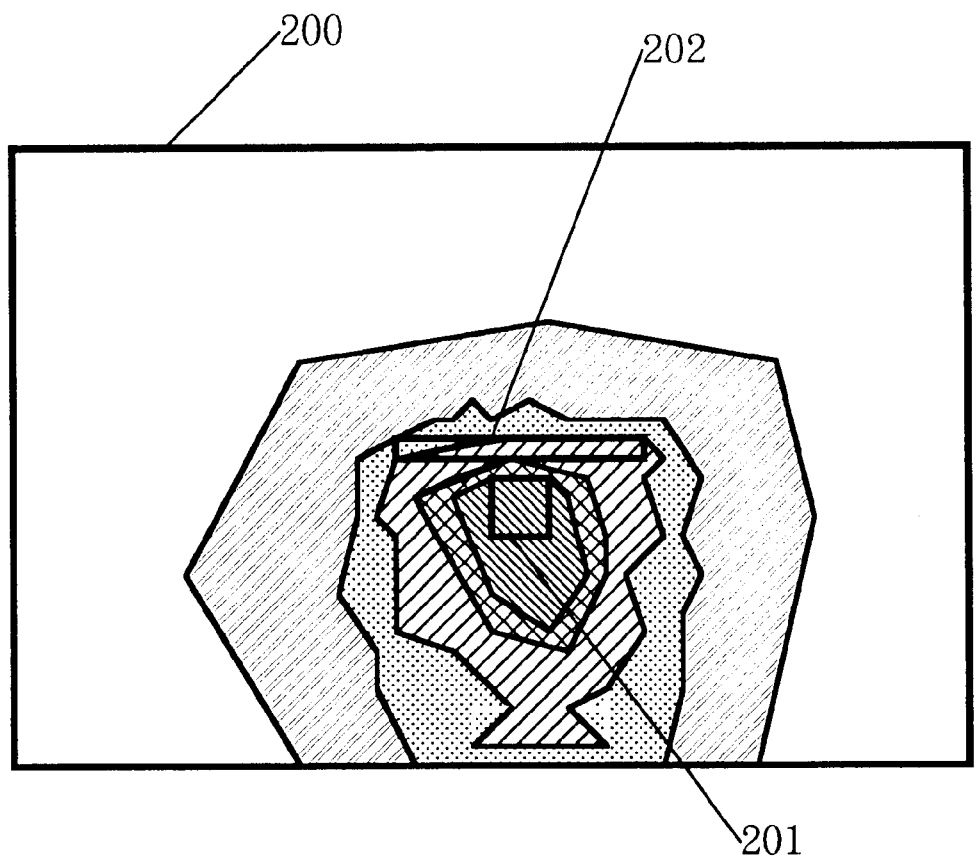
FIG. 19 is a distribution of temperature in the experiment of FIG. 18.
Figure 20A:
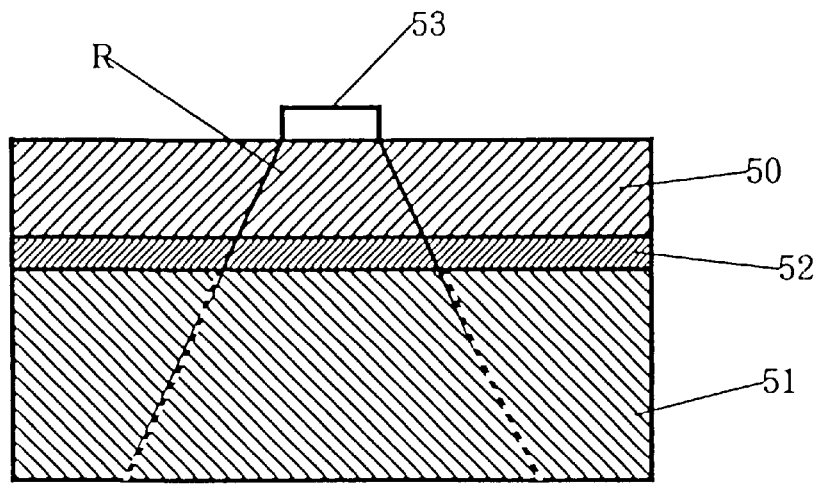
FIGS. 20A and B are cross-sectional views illustrating several problems raised when two plate-like members are bonded together.
Figure 20B:
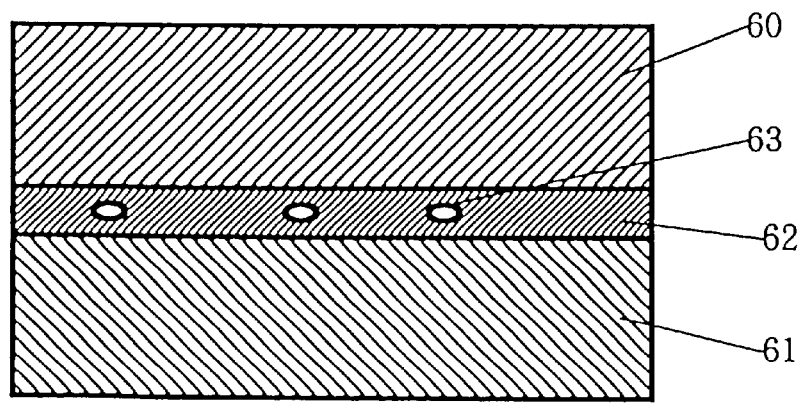

FIG. 19 shows the results of this experiment described. As will be apparent from FIG. 19, the conduction of heat generated by the CPU is shut out by the heat insulation opening 202, such that the increase of temperature in the plate portion above the heat insulation opening 202 will be suppressed.

The electronic equipment housing of the present invention may be applied to a motorcar door, for example. For example, metal plates of 0.6 and 0.2 mm thick as formed of aluminum are bonded to each other. Outwardly turned cutouts may be formed in the bonded plate and used to hold a powered-window motor, locking plungers, unlocked door sensor and others. This can reduce the weight and manufacturing cost.

In the embodiment of the present invention, it is preferable to conduct chemical conversion coatings at least on one side of the aluminum alloy contacting the adhesive layer. This improves the adhesiveness (adhesive strength) as well as the formability. To conduct the chemical conversion coatings may be carried out by any of various techniques. In view of cost, easy treatment and so on, it is general to use the phosphoric acid chromate coating treatment which is performed through the following steps and under the following conditions:

| Steps | Conditions |
|---|---|
| 1. Acid cleaning<br>↓<br>2. Water cleaning<br>↓ | 30% $HNO_3$<br>Reference: RT × 60 sec. |
| 3. Degreasing<br>↓<br>4. Water cleaning<br>↓ | Fine Cleaner 364S available from NIHON PARKERIZING CO., LTD.<br>Reference: 60° C. × 30 sec. |
| 5. Phosphoric acid chromating<br>↓<br>6. Water cleaning<br>↓ | AM-K70 available from NIHON PARKERIZING CO., LTD.<br>Mass of deposited Cr in the chemical conversion coatings = 20 $mg/m^2$<br>Reference: 45° C. × 20 sec. |
| 7. Pure water cleaning (Demineralized water cleaning)<br>↓<br>8. Air drying | |

As the chemical conversion coating treatment, the chromic acid chromate coating can also be used.

The electronic equipment housing of the present invention may further be applied to any of various structures such as vehicle doors, telephones, facsimile, TV, video cameras, portable acoustic instruments (including portable tape recorders, portable CD players and others), on-vehicle electric parts (including motor-car junction box and so on), communication housing (including a housing for hanging signal exchanger), image display housings (including PDP, Brown tube type TV and so on), battery housings (including NAS cell housing), fixed computer housings, optical disk writing/reading devices (DVD players and others) and so on.

The present invention is not limited to the aforementioned forms, but may be modified or changed to any of various other forms without departing from the scope of the invention as defined in the appending claims. For example, the number of plate-like members may be equal to three or more. The plate-like members may be bonded together through any low-melting metal such as solder.

A plate-like member may at least partially be formed of metal. The plate-like members may be bonded together through any organic material.

Furthermore, the metallic parts of the plate-like members may include protrusions such as ribs or bosses.

In the electronic equipment housing of the present invention, for example, for example, the thicker plate-like member may be used to mount a part or to reinforce the housing while the thinner plate-like member may be used to decorate the outer surface of the housing.

In the electronic equipment housing of the present invention, the area into which heat is dissipated from the heating part can be increased so that the heat can effectively be radiated from the heating part, since one plate-like member directly supporting the heating part is thicker than the other plate-like member.

In the electronic equipment housing of the present invention, no air bubble can occur within the adhesive layer since the air-vent or adhesive-bleeding grooves or holes are formed in the bond area. As a result, the heat conduction between the plate-like members as well as the adhesive force in the adhesive layer can be maintained better. Even if the temperature in the housing increases, the plate-like members can be prevented from being separated from each other due to the increased temperature.

In the electronic equipment housing of the present invention, the heat-conduction regulating portions may be provided on the bond area between the plate-like members. By properly disposing the heat-conduction regulating portions depending on the purposes, the heat conduction can properly be regulated in the desired direction of heat flow.

In the electronic equipment housing of the present invention, the entire electronic equipment housing can be reduced in weight since the weight reducing openings are formed in the plate-like members.

In the electronic equipment housing of the present invention, the heat in the plate-like members can be radiated through the heat pipe or pipes mounted thereon.

In the electronic equipment housing of the present invention, the electronic parts mounted on the plate-like members can be utilized.

In the electronic equipment housing of the present invention, the heat generated by the heating part can more effectively be radiated through the heat conducting member which is provided between the plate-like member and the heating part mounted on the same plate-like member.

In the electronic equipment housing of the present invention, the conduction of heat from the heating part can be prevented by the heat insulation opening or openings on the plate-like members. Thus, the operational efficiency of any electronic part adjacent to the heating part will not be degraded due to influence of heat. This can also prolong the service life in the final product.

In the electronic equipment housing of the present invention, the plate-like members are bonded to each other through the resin material at the opposite sides. Heat generated by the heating part mounted on one of the plate-like members can be insulated by the resin material to prevent the heat conduction to the other plate-like member.

In the electronic equipment housing of the present invention, the direction of heat conduction can be changed by the use of the thermally deformable member which is located within the opening formed in the plate-like member.

In the electronic equipment housing of the present invention, the adhesive strength can be increased to improve the reliability in the final product since the bond surfaces of the plate-like members are wholly or partially roughened to have small dimples of a size exceeding one microns.

In the electronic equipment housing of the present invention, the dimensional precision between the parts as well as the strength of the parts can be improved to improve the reliability in the product, in comparison with solely mounted parts, since the plural parts are connected together to form an integrally formed composite part.

In the electronic equipment housing of the present invention, it comprises the frame member capable of being formed thicker. Thus, the electronic equipment housing of the present invention can be produced for a shortened period of time, in comparison with the housing wholly formed of laminated plate structure.

If a electronic equipment housing is formed of aluminum, it has been found that the vibration in that electronic equipment housing is reduced to about 6 dB as measured by the accelerometer, in comparison with the electronic equipment housing formed of magnesium.

What is claimed is:

1. An electronic equipment housing, comprising two or more plate members bonded face-to-face to one another, wherein only an inner plate member comprises weight-reducing openings formed therethrough.

2. An electronic equipment housing, comprising two or more plate members bonded face-to-face to one another, wherein an inner plate member of said plate members has heat-insulation openings formed between a heating part mounted on said inner plate member and another electronic part mounted thereon.

3. An electronic equipment housing, comprising an integrally formed plate member, wherein said plate member has one face on which a heating part is mounted, and wherein the one face has heat-insulation openings formed therethrough between said heating part and an other electronic part mounted on said one face.

4. An electronic equipment housing, comprising two or more plate members bonded face-to-face to one another; wherein an inner plate member of said plate members has openings formed between a heating part mounted on the inner plate member and an other electronic part mounted on the inner plate member; and wherein each of said openings includes a thermally deformable member located therein, whereby said deformable member deforms to conduct heat from said heating part without passing through the other electronic part.

5. An electronic equipment housing, comprising at least outer and inner plate members and formed by pressing together two or more metallic plate members of substantially the same size; wherein said outer and inner plate members are bonded face-to-face; wherein said inner plate member includes a plurality of cut and turned-up portions, each cut and turned-up portion supporting an electronic part mounted on the inner plate member; and wherein heat-conduction regulating means are partially provided in an interface between said outer and inner bonded plate members.

* * * * *